Patented Dec. 16, 1941

2,266,568

UNITED STATES PATENT OFFICE 2,266,568

ROSIN MODIFIED BY A PHENOL-KETONE-FORMALDEHYDE RESIN

Israel Rosenblum, New York, N. Y.

No Drawing. Application March 2, 1938,
Serial No. 193,447

10 Claims. (Cl. 260—25)

The present invention relates to synthetic resins suitable for the manufacture of oil varnishes and more particularly to oil-solubilized condensates of a phenol, a ketone and an aldehyde.

This application is a continuation-in-part of my applications, Ser. No. 538,248, filed May 18, 1931; Ser. No. 580,495, filed December 11, 1931; Ser. No. 594,379, filed February 20, 1932; and Ser. No. 628,298, filed August 11, 1932.

It is a general object of the invention to produce an oil-soluble resin consisting essentially of rosin or equivalent acidic natural resin which has been hardened and made more durable by the incorporation therein of a thermo-setting resin composed of a phenol, a ketone and an aldehyde, preferably formaldehyde, said phenolic resin having a high proportion of aldehyde and normally being convertible into the insoluble and infusible state upon heating to elevated temperatures.

More specifically, it is an object of the invention to provide a resin which is characterized by the property of yielding non-penetrating varnishes, for example with linseed and Perilla oils, by which I mean the capacity to dry over porous surfaces without penetrating the latter to any considerable extent. It is also an object of the invention to produce a resin which yields solutions of high viscosity when mixed with equal amounts of varnolene or mineral spirits.

Resins composed of a phenol, a ketone and an aldehyde, particularly formaldehyde, are not soluble in varnish oils, especially when the proportion of formaldehyde is high and the phenol is one of the lower members of the series, but their presence in varnishes is highly desirable because of their high melting point, durability and color stability. The melting point increasing effect of the phenolic resin is increased as the proportion of formaldehyde is raised but increased proportion of formaldehyde render the resin more easily thermo-setting and thus make it more difficult to combine the resin with rosin.

I have found that when the phenolic body, the ketone and the formaldehyde are condensed in the presence of the rosin, and especially in the presence of a compound of zinc as a catalyst, proportions of formaldehyde may be employed which would yield a thermo-setting resin with the phenolic body and the ketone; yet the mixture may be heated to elevated temperatures without causing precipitation of phenolic resin even when the proportion of such resin is relatively high. Resinous products so obtained form very desirable varnishes with various drying and non-drying vegetable oils. They differ from a resinous product obtained by heating rosin with a phenol-formaldehyde condensate (i. e., containing no acetone) the proportions of phenolic condensate to rosin, the molecular proportion of formaldehyde to phenol, the catalyst and the solvent, if employed, all being assumed to be the same in having a higher melting point, a higher viscosity at elevated temperatures, a higher viscosity in 1:1 solution in varnolene and lower solubility in varnolene above the 1:1 limit. The point at which the modified resin is not even soluble in an equal amount of varnolene is arrived at with a lower proportion of a phenol-ketone-formaldehyde condensate than of a phenol-formaldehyde condensate wherein the proportion of formaldehyde to phenol is the same.

These properties are contributed to a proportionate degree to the oil varnish made with such resins, i. e., the film is harder, the varnish is more viscous when thinned with the same amount of solvent and is more viscous when the solvent is partially removed. These properties are desirable in, for example, wood oil varnishes, for reasons of better drying and economy; in addition, the phenol-ketone-formaldehyde resins are of much lower yellowing character than ordinary phenol-formaldehyde resins and in this respect compare favorably with the more expensive amyl and butyl phenol-formaldehyde resins. With linseed and Perilla oils, as already indicated, the resins can be employed for the manufacture of so-called non-penetrating varnishes ("overprint" varnishes).

In carrying out the invention, the phenol is preferably first condensed with the ketone, such as acetone, to produce a diphenylol or homologous compound, which is then reacted with formaldehyde in the presence of rosin or equivalent acidic natural resin, and of a catalyst preferably a compound of zinc. The proportion of formaldehyde to the phenol which is condensed with the ketone is considerably greater than equimolecular and may be as high as two and even three mols of formaldehyde to one of phenol. In spite of this unusually high proportion of formaldehyde, which ordinarily would form a rapidly thermo-setting resin, the phenol-ketone-formaldehyde condensate forms a uniform product with the natural resin, and this product may be combined with vegetable oils at temperatures of the order of 250–300° C. without causing precipitation of phenolic resin.

The final product may be permitted to remain acidic, in which case it may be employed for hardening ester gum, the resulting dilution reducing the acid number; or it may be neutralized, as with glycerol. In the latter case, the glycerol is preferably added to the resinous condensate at a temperature of about 180° C., as I have found that the properties of the product are improved by beginning the esterification at this relatively low temperature. If desired, the glycerol may be added to the initially reacting mixture of phenol-ketone condensate, formaldehyde and rosin.

The proportion of the phenol-ketone-formaldehyde condensate in the final product may range from about 8 to 15% and even be as high as 20%, depending usually upon the proportion of formaldehyde and also upon the character of the phenol. This relatively high proportion of phenolic resin, particularly in the case of phenols like ordinary phenol, cresol and xylenol, is quite contrary to expectations, since the phenol-acetone-formaldehyde condensate is ordinarily more rapidly thermo-setting than the phenol-formaldehyde condensates which are at present combined with rosin and yet can be incorporated in at least equal amounts and even in larger amounts in rosin. In the examples described below, the weight of phenol-ketone condensate is of the order of 8–12% of the weight of the rosin.

The invention will be further described in greater detail with the aid of the following examples, which are presented for illustrative purposes only.

*Example 1*

| | Grams |
|---|---|
| Rosin | 1000 |
| Diphenylolpropane | 80 |
| Formaldehyde (40% solution) | 160 |
| Zinc acetate | 5 |

(the proportion being about 3 mols of formaldehyde to each mol of original phenol) are heated together for about 12 hours under reflux or at 10 lbs. pressure in a closed vessel at about 110° C. The product is then dehydrated by gradually raising the temperature, the final dehydration temperature being about 180° C. At this point, an amount of glycerol equal to about 10% by weight of the rosin is added and the esterification effected by heating at about 180° C. and then raising the temperature to about 250° C. at which the mass is kept for about 12 hours. There is obtained a substantially neutral resin, the acid number being very low (about 10), the melting point, on the other hand, being relatively high (120–125° C.). The resin has only a limited solubility in mineral spirits, but is soluble in drying and non-drying vegetable oils, and produces excellent oil varnishes therewith, which are particularly marked by their ability to dry over porous surfaces without penetrating them to any considerable extent.

The initial reaction may take place in the presence of a solvent which is subsequently expelled.

*Example 2*

To produce a resin having a higher proportion of phenol-acetone-formaldehyde condensate, it is advisable to reduce somewhat the proportion of formaldehyde as follows:

| | Grams |
|---|---|
| Rosin | 1000 |
| Diphenylolpropane | 120 |
| Formaldehyde (40% solution) * | 160 |
| Zinc acetate | 5 |

*2 mols for each mol of phenol originally employed.

are reacted as described in Example 1. After the dehydration of the resin, about 12% of glycerine based on the weight of rosin is added at about 180° C., or at a lower temperature, the temperature being gradually raised to 250° C. and the esterification being finished at such temperature. A resin is obtained having about the same melting point as in Example 1, but it is more viscous and even less soluble in mineral spirits than the product of Example 1.

*Example 3*

| | Grams |
|---|---|
| Rosin | 1000 |
| Diphenylolpropane | 100 |
| Formaldehyde (40% solution) | 200 |
| Zinc acetate | 5 |
| Glycerol | 110 | are heated together under reflux or at about 110° under a slight pressure. The mass is gradually heated to 250° C. without interruption and is kept at such temperature until the esterification is completed. A resin similar to those obtained in Examples 1 and 2 is produced, and has the same low acid number (10–15).

The synthetic resins above described may be incorporated in varnish oils to produce non-penetrating varnishes in, for example, the following proportions:

| | Pounds |
|---|---|
| Synthetic resin | 100 |
| Bodied linseed oil | 80 |
| Mineral spirits | 75 |
| 1% cobalt naphthenate solution | 3 |

The resin and oil are heated to about 280° C. for about ½ hr.; the mixture is then cooled to about 230° C., whereupon the thinner and drier are added. By reason of the presence in this varnish of a synthetic resin comprising a neutralized, rosin-modified, diphenylolpropane-formaldehyde resin, produced in the presence, preferably, of a zinc compound catalyst, the proportion of phenolic resin being about 8 to 15% or more of the whole synthetic resin, there results a varnish which, when applied to a porous paper surface, does not "poke through," that is, does not penetrate the paper but forms a glossy, hard film on the surface of the paper ("overprint"). With other known types of oil-soluble, phenolic resins, a more penetrating varnish is obtained, which is undesirable for overprinting purposes.

In place of the diphenylolpropane, employed in Examples 1, 2 and 3, other condensation products of a ketone, aliphatic or aromatic, including, aside from acetone, methyl butyl ketone, methyl ethyl ketone, methyl acetate, cyclohexanone, diacetone alcohol, acetophenone, etc. with phenols, including the higher homologues of phenol and also other substituted phenols, may be employed. The rosin may be replaced in whole or in part with other natural resins of acidic character, such as dry distilled Congo resin.

It is not necessary to neutralize the rosin-modified phenolic resin substantially completely, or at all, for the resin can be mixed with a relatively large proportion of neutral ester gum and the acid number thereby reduced.

I claim:

1. The method of producing an oil-soluble phenolic resin capable of yielding non-penetrating varnishes, which comprises heating within a temperature range from refluxing temperature to a temperature of about 110° C. a mixture consisting essentially of (1) a phenol-ketone condensation product combined in the proportion of 2 mols of phenol to about 1 mol of ketone, (2) formaldehyde, and (3) rosin, the molecular proportion of the formaldehyde to original phenol being at least about 2 to 1 and the phenol-ketone product constituting from a substantial amount up to about 12% by weight of the rosin, until a resinous condensate is obtained.

2. The method of producing an oil-soluble phenolic resin capable of yielding non-penetrating varnishes, which comprises heating within a temperature range from refluxing temperature to a temperature of about 110° C. a mixture consisting essentially of (1) a phenol-ketone condensation product combined in the proportion of 2 mols of phenol to about 1 mol of ketone, (2) formaldehyde, and (3) rosin, the molecular proportion of the formaldehyde to original phenol being at least about 2 to 1 and the phenol-ketone product constituting from a substantial amount up to about 12% by weight of the rosin, until a resinous condensate is obtained, and subsequently heating the mass with glycerol to effect substantial neutralization thereof.

3. The method according to claim 1 wherein the phenol-ketone condensation product constitutes about 8–12% by weight of the rosin.

4. The method according to claim 1 wherein the phenol is ordinary phenol and the ketone is acetone.

5. The method of producing an oil-soluble phenolic resin capable of yielding non-penetrating varnishes, which comprises heating within a temperature range from refluxing temperature to a temperature of about 110° C. a mixture consisting essentially of (1) a phenol-ketone condensation product combined in the proportion of 2 mols of phenol to about 1 mol of ketone, (2) formaldehyde, and (3) rosin, the molecular proportion of the formaldehyde to original phenol being at least about 2 to 1 and the phenol-ketone product constituting from a substantial amount up to about 12% by weight of the rosin, with a small proportion of zinc acetate, until a resinous condensate is obtained.

6. The method of producing an oil-soluble phenolic resin capable of yielding non-penetrating varnishes, which comprises heating within a temperature range from refluxing temperature to a temperature of about 110° C. a mixture consisting essentially of (1) a phenol-ketone condensation product combined in the proportion of 2 mols of phenol to about 1 mol of ketone, (2) formaldehyde, and (3) rosin, the molecular proportion of the formaldehyde to original phenol being at least about 2 to 1 and the phenol-ketone product constituting from a substantial amount up to about 12% by weight of the rosin, with a small proportion of zinc acetate, until a resinous condensate is obtained, and subsequently heating the mass with glycerol to effect substantial neutralization thereof.

7. A synthetic resin prepared in accordance with the process of claim 1.

8. A synthetic resin prepared in accordance with the process of claim 2.

9. A synthetic resin prepared in accordance with the process of claim 5.

10. A synthetic resin prepared in accordance with the process of claim 6.

ISRAEL ROSENBLUM.